United States Patent
Erb et al.

(10) Patent No.: US 9,154,502 B2
(45) Date of Patent: Oct. 6, 2015

(54) ACCESSING OBJECTS IN HOSTED STORAGE

(71) Applicant: Google Inc., Mountain View, CA (US)

(72) Inventors: David Erb, Seattle, WA (US); Erkki Ville Aikas, Seattle, WA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 13/756,383

(22) Filed: Jan. 31, 2013

(65) Prior Publication Data

US 2014/0215574 A1    Jul. 31, 2014

(51) Int. Cl.
*G06F 7/04*    (2006.01)
*H04L 29/06*    (2006.01)

(52) U.S. Cl.
CPC .................................. *H04L 63/10* (2013.01)

(58) Field of Classification Search
CPC .... H04L 63/08; H04L 63/102; G06F 21/6218
USPC .................................................. 726/2, 4, 27
See application file for complete search history.

(56) References Cited

U.S. PATENT DOCUMENTS

| 6,539,396 | B1 | 3/2003 | Bowman-Amuah |
| 7,702,725 | B2 * | 4/2010 | Erickson et al. ............. 709/203 |
| 7,752,214 | B2 | 7/2010 | Pizzorni et al. |
| 7,836,084 | B1 * | 11/2010 | Lin .............................. 707/792 |
| 7,991,748 | B2 * | 8/2011 | Rowan et al. ................. 707/677 |
| 8,191,109 | B2 * | 5/2012 | Rhodes ............................. 726/3 |
| 8,370,370 | B2 * | 2/2013 | Huang et al. ................. 707/755 |
| 2003/0005297 | A1 * | 1/2003 | Fichtner et al. .............. 713/168 |
| 2009/0216908 | A1 * | 8/2009 | Moromisato et al. ......... 709/248 |
| 2010/0011091 | A1 * | 1/2010 | Carver et al. ................. 709/219 |

OTHER PUBLICATIONS

Kulkarni et al. 'Information Access in Mobile Computing Environments' Technical Report 93-11, Distributed Computing Research Lab, University of Notre Dame, Notre Dame, IN, Oct. 1993, 17 pages.

Welch 'A Comparison of three Distributed File System Architectures: Vnode, Sprite, and Plan 9' Xerox PARC, Palo Alto, CA, 18 pages.

* cited by examiner

*Primary Examiner* — Ali Abyaneh
(74) *Attorney, Agent, or Firm* — Fish & Richardson P.C.

(57) ABSTRACT

A hosted storage service stores a virtual data object that corresponds to data. The virtual data object includes metadata that enables access to the data in a delegated storage service but does not include the data. A delegate storage service stores the data. The hosted storage service receives a request for access to the virtual object and sends a response that includes metadata to access the data in a delegated storage service. The delegate storage service receives a request for access to the data based on the metadata. In response to receiving the request for access to the data object, the delegate storage service sends the data to the client application.

12 Claims, 9 Drawing Sheets

ACCESSING OBJECTS IN HOSTED STORAGE

TECHNICAL FIELD

This document relates to hosted storage.

BACKGROUND

Hosted, or cloud-based, storage refers to off-site or remote data storage that is typically provided by a third party. The third party may implement the hosted storage in a data center, and provide access to the hosted storage over a network, such as the Internet.

SUMMARY

In one aspect, a system includes one or more processing devices configured to implement a hosted storage service configured to store a virtual data object that corresponds to data. The virtual data object includes metadata that enables access to the data in a delegated storage service but does not include the data. The hosted storage service is further configured to receive, from a client application, a request for access to the virtual object. The hosted storage service is further configured to send a response that includes metadata to access the data in a delegated storage service. The processing devices are further configured to implement the delegated storage service configured to store the data. The delegate storage service is further configured to receive, from the client application, a request for access to the data. The delegate storage service is further configured to in response to receiving the request for access to the data object, send the data to the client application. The processing devices are further configured to implement the client application configured to send the request for access to the virtual object to the hosted storage service. The client application is further configured to receive, from the hosted storage service, the response that includes metadata to access object in delegate storage service. The client application is further configured to generate the request for access to the data based on the metadata. The client application is further configured to send the request for access to the data to the delegated storage service. The client application is further configured to receive the data from the delegated storage service Implementations can include any, all, or none of the following features. The request for access to the virtual object may include user credentials for a user and the hosted storage service may be configured to determine that the user is authorized to access the virtual data object based on the user credentials and an access control list associated with the virtual data object. In response to determining that the user is authorized to access the virtual data object, the hosted storage service can send, to the client application, the response that includes the metadata that enables access to the data in the delegated storage. The hosted storage service can be configured to receive a request to store the data object, the request indicating that the data object should be stored as a virtual object and including information enabling access to the data object in delegated storage; and in response to receiving the request to store the data object, create the virtual object. The hosted storage service can be further configured to store a data object that contains data for the data object; receive, from the client application, a request for access to the data object; and send a response that includes the data object. The client application can be further configured to send the request for the data object in the hosted storage service; and receive, from the hosted storage service, the data object. The client application can be authenticated by the hosted storage service and the client application may not authenticated by the delegate storage service.

In one aspect, a method is performed by one or processors. The method includes storing, by a hosted storage service, a virtual data object that corresponds to data. The virtual data object includes metadata that enables access to the data in a delegated storage service but does not include the data. The method further includes receiving, by the hosted storage service and from a client application, a request for access to the virtual object. The method further includes sending, from the hosted storage service, a response that includes metadata to access the data in a delegated storage service such that the client application is able to access the data in the delegate storage service.

Implementations can include any, all, or none of the following features. The request for access to the virtual object can include user credentials for a user, the method can further include determining, by the hosted storage service, that the user is authorized to access the virtual data object based on the user credentials and an access control list associated with the virtual data object. In response to determining that the user is authorized to access the virtual data object, the hosted storage system can send, by the hosted storage service to the client application, the response that includes the metadata that enables access to the data in the delegated storage. The method can include receiving, by the hosted storage service, a request to store the data object, the request indicating that the data object should be stored as a virtual object and including information enabling access to the data object in delegated storage; and in response to receiving the request to store the data object, creating, by the hosted storage service, creating the virtual object. The method can include storing, by the hosted storage service, a data object that contains data for the data object; receiving, by the hosted storage service from the client application, a request for access to the data object; and sending, by the hosted storage service, a response that includes the data object. The client application can be authenticated by the hosted storage service and the client application may not authenticated by the delegate storage service.

In one aspect, a computer readable storage medium stores a computer program, the program includes instructions that, when executed by one or more processing devices, cause the one or more processing devices to perform a method. The method includes storing, by a hosted storage service, a virtual data object that corresponds to data. The virtual data object includes metadata that enables access to the data in a delegated storage service but does not include the data. The method further includes receiving, by the hosted storage service and from a client application, a request for access to the virtual object. The method further includes sending, from the hosted storage service, a response that includes metadata to access the data in a delegated storage service such that the client application is able to access the data in the delegate storage service Implementations can include any, all, or none of the following features. The request for access to the virtual object can include user credentials for a user, the method can further include determining, by the hosted storage service, that the user is authorized to access the virtual data object based on the user credentials and an access control list associated with the virtual data object; and in response to determining that the user is authorized to access the virtual data object, sending, by the hosted storage service to the client application, the response that includes the metadata that enables access to the data in the delegated storage. The method can further include receiving, by the hosted storage service, a request to store the data object, the request indicating that the data object should be stored as a virtual object and including information enabling access to the data object in delegated storage; and in response to receiving the request to store the data object, creating, by the hosted storage service, creating the virtual object. The method can further include storing, by the hosted storage service, a data object that contains data for the data object; receiving, by the hosted storage service from the client application, a request for access to the data object; and sending, by the hosted storage service, a response that includes the data object. The client application can be authenticated by the hosted storage service and the client application may not authenticated by the delegate storage service.

The details of one or more implementations are set forth in the accompanying drawings and the description below. Other features and advantages will be apparent from the description and drawings, and from the claims.

DETAILED DESCRIPTION

Logs of user activity in a hosted storage system can be protected according to a security scheme that prevents unauthorized access. For instance, the users can send requests to the hosted storage system to perform operations related to objects stored in the hosted storage system. Information about those requests and the operations may be logged in a protected environment. A query system may access those logs on behalf of an authorized user (e.g. the end user that owns the related data, that user's information technology department, etc.), and may be configured to run user queries on the logged information to provide the user with information on the use of the hosted storage system. For instance, an authorized user may submit queries to determine the objects accessed the most in a time period, or to determine which users perform the most operations on objects in a time period, and an unauthorized user's queries may be denied. These unauthorized users can include the owners, operators, and/or administrators of the hosted storage system and/or the query system, protecting an end user's data.

In one configuration, the hosted storage system can store data objects and virtual objects. The virtual objects can reference data objects stored in another system, such as the query system. In a particular example, logs of user activity with respect to the hosted storage system can be stored as virtual objects, with the underlying data for the virtual objects being stored in the query system. Both the data objects and virtual objects can be managed by the hosted storage system with some of the same mechanisms. For example, authentication, authorization, file organization, and search tools of the hosted storage system can be configured to treat the data objects and the virtual objects identically for their related tasks. This may allow, for example, systems other than the hosted storage system to use the authorization mechanisms of the hosted storage system to control access to some data, even if the data itself is not stored in the hosted storage system.

Figure 1:
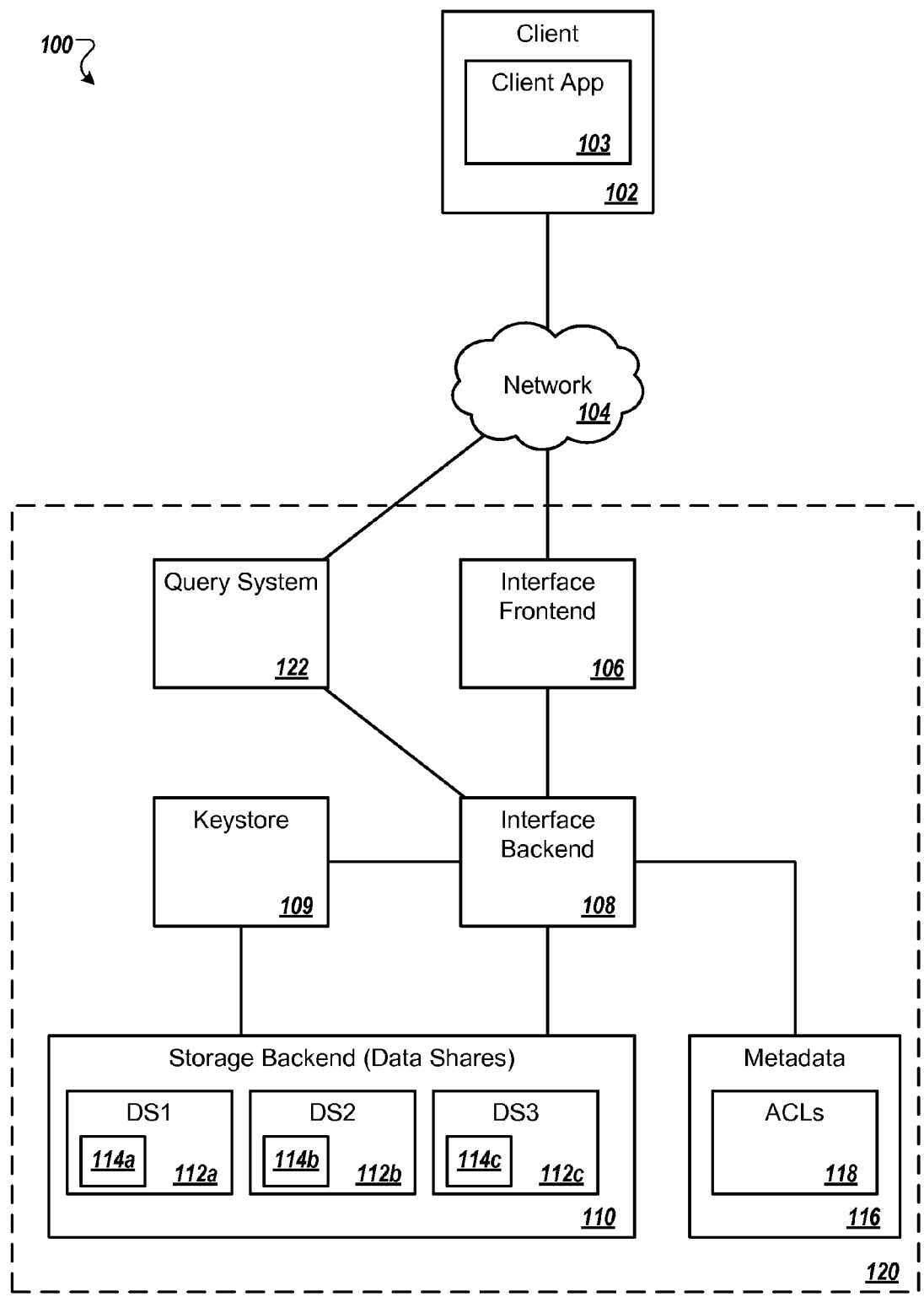
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device 102. In some implementations, a hosted storage services 120 can provide access to stored data by applications running on computing devices geographically separate from each other, provide offsite data backup and restore functionality, provide data storage to a computing device with limited storage capabilities, and/or provide storage functionality not implemented on a computing device.

The system 100 can provide scalable stores for storing data objects. The client device 102 can upload data objects to the hosted storage service 120 and control access to the uploaded data objects. Access control can include a range of security levels, from keeping data securely confidential to publishing it without restrictions. Data stored in hosted storage service 120 can be secured from unauthorized access. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for mutual business reasons (e.g., submission of work product ordered by the owner of the hosted storage service 120), or for use in data processing by other services (e.g., images uploaded are used to automatically and dynamically create a photo gallery web page.)

Figure 8:
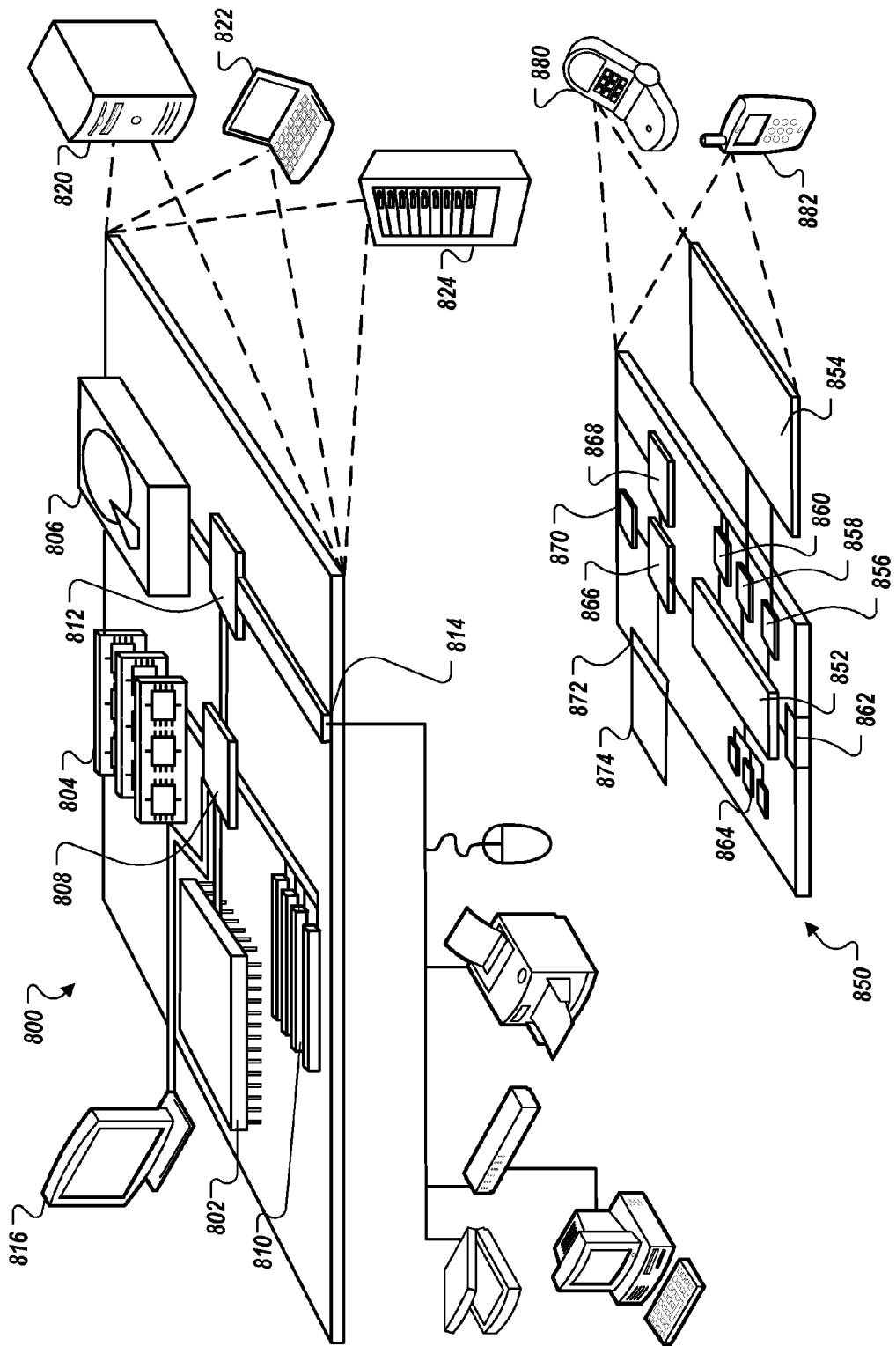
FIG. 8 shows an example of a computing device and a mobile computing device.

The client device 102 can be implemented using a computing device, such as the computing device 800 or the mobile device 850 described with respect to FIG. 8. The client device 102 can communicate with the hosted storage service 120 via a network 104, such as the Internet. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data objects in the hosted storage service 120. The hosted storage service 120 can be implemented by one or more server devices, which can be implemented using a computing device, such as the computing device 800 or mobile device 850 described with respect to FIG. 8. For example, the hosted storage service 120 can be implemented by multiple server devices operating in the same, or different, data centers.

The hosted storage service 120 generally includes an interface frontend 106, an interface backend 108, a storage backend 108, metadata 116 for objects stored in the storage backend 108, a keystore 109, and a query system 122. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 120. The PUT and POST verbs may be used to upload an object to the service 120. PUT requests can come from the client 102 and contain authentication and authorization credentials and object metadata in a header, such as an HTTP header. POST requests can be received when a client 102 wants to upload from a web browser form. The form POST upload protocol for the hosted storage service 120 can involve multiple required form fields to provide authentication, authorization and object metadata. More generally, any of the API requests may include credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 120 (e.g., if the organization operating the hosted storage service 120 also operates other web services such as email service.) A user can also or alternatively be authenticated based on authentication credentials from an external credentialing service or an external service that includes credentialing functionally. User or group identifier information can be calculated from the external service's credential information. Requests sent by the client 102 to the interface frontend 106 can be translated and forwarded to the external service for authentication.

In general, objects stored in the hosted storage service 120 can be referenced by object identifiers. The hosted storage service 120 can define namespaces to which a valid object identifier must conform, and any appropriate namespace convention may be used. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers. In still another example, universally unique identifiers (UUIDs) may be used.

Objects can be stored in hosted storage service 120 in buckets. In some examples, each bucket is uniquely named in the hosted storage service 120, each object is uniquely named in a bucket, and every bucket and object combination is unique. Objects may be uniquely identified by a URI that includes the bucket name and the object name, and identifies the hosted storage service 120. For example, an object named "long/song.mp3" in a bucket named "music" could be specified using a URI pattern such as http://s.[anyexampledomain].com/music/long/song.mp3 or http://music.s.[anyexampledomain].com/long/song.mp3. Alternatively, the user of the client 102 can create a bucket named www.[secondexampledomain], publish a CNAME alias redirecting that to http://music.s.[anyexampledomain].com, and address the object as http://www.[secondexampledomain]/long/song.mp3. In some examples, buckets do not nest.

The interface backend 108 can handle request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted.) Some or all of these activities can be logged in activity logs by the interface backend 108. The interface backend can also provide encryption and decryption services to prevent unauthorized access to data, even by internal users.

A keystore 109 can store encryption keys for data objects, where the encryption keys have themselves been encrypted by the interface backend 108. The encrypted keys can carry associated metadata that is cryptographically bound to the key itself, and are referred here to as wrapped keys. From the point of view of the interface backend 108, the wrapped keys can be opaque objects. To obtain the cleartext key of a wrapped key for use (e.g., to encrypt or decrypt a data object) the interface backend 108 can provide the wrapped key and client authentication credentials to the keystore 109. The keystore 109 can verify, based in part on the wrapped key's metadata, that the provided authentication credential is sufficient to authorize release of the key, and if so, can return the unwrapped key to the interface backend 108. The interface backend 108 can use the key to encrypt or decrypt the data object and then can discard the key.

In some examples, the encryption key is a symmetric key that can be used to both encryption and decrypt an object. In some examples, a wrapped key can have associated metadata indicating multiple users or groups authorized to access the cleartext key. In some examples, the keystore 109 can copy a wrapped key and rewrap the key for a different principal (e.g., containing different metadata).

The interface backend 108 can manage metadata 116 associated with data objects, for example in a structured data format such as a database (e.g., MySQL). User-specified names labeling the buckets can be completely defined within the metadata 116, and object metadata 116 can map a resource name to one or more data shares 112 storing the resource. The metadata 116 can also contain bucket and object creation times, object sizes, hashes, and access control lists 118 (ACL 118) for both buckets and objects. The interface backend 108 can log activity and track storage consumption to support accounting for billing and chargebacks. In some examples, this include quota monitoring in each dimension in which customers are charged (e.g., reads, writes, network transfers, total storage in use.)

The ACLs 118 define who is authorized to perform actions on corresponding buckets or objects, and the nature of the permitted actions. The ACLs 118 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Object Roles below shows a list of example roles that can be included in ACLs 118 for data objects.

TABLE 1

Bucket Roles

| Role | Capabilities |
|---|---|
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
|---|---|
| READ | Can read the object. |
| FULL_CONTROL | READ capabilities plus ability to read and write the object ACL. |

Scopes can be defined as a single user or a group of users. In one implementation, those users with a FULL_CONTROL role (and therefore able to modify the ACL for a given bucket or resource) may define a group of users, and then provide a role for the group. For example, a group of users may be managed by the hosted storage service 120 (or, more generally, by the service provider that provides the hosted storage service 120) for reasons other than storage permissions (for example, for a message board or other service that employs groups) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group.

Table 3: Scopes below shows a list of example scopes that can be included in ACLs 118 for buckets and/or data objects.

TABLE 3

Scopes

| Name | Description |
|---|---|
| Service ID | A single authenticated user specified by username. |
| Email Address | A single user specified by an email address. |
| Service Group ID | A group of users managed by the hosted storage service 120 and specified by an associated identifier. |
| Invite Token | One or more users with access to a one time use digital token. |
| Group-Restricted Key | One or more users with access to a permanent use digital key. |
| All Service Users | All authenticated users of the hosted storage service 120. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 118 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 118. In some examples, it is possible to create an object that the bucket owner cannot read.

The storage backend 108 can contain multiple datastores 112*a*-112*c*. Although three datastores 112 are shown, more or fewer are possible. Each of the datastores 112*a*-112*c* can store data objects 114*a*-114*c* in a particular format. For example, data store 112*a* can store a data object 114*a* as a Binary Large Object (BLOB), data store 112*b* can store a data object 114*b* in a distributed file system (e.g., Network File System), and data store 112*c* can store a data object 114*c* in a structured data format such as a database (e.g., MySQL.)

The hosted storage system 120 can be configured to receive, from the client 102, a request to perform operations related to stored data objects, and, in response, perform those operations. The interface backend 108, or other components of the hosted storage system 120, can log information regarding the performed operations by generating or adding to hosted storage system logs, which can be used to generate activity logs for particular objects or buckets. In some implementations, the activities recorded include user initiated or user-level activities such as storing, reading, writing, moving, or deleting a data object, or permission change events related to a data object. In some implementations, lower level activities (e.g. disk maintenance, checksum verification) or non-user related activities (e.g. administrator activities) may not be recorded.

The activity logs can be stored in the query system 122, for example as structured data that can be efficiently indexed and searched by authorized users. Virtual log objects for the activity logs can be created by the interface backend 108 and stored in the storage backend 108. These virtual objects can include, for example, metadata identifying the activity logs in the query system 122. For example, if the query system 122 stores activities in a table of uniquely keyed rows, a virtual object may contain a list of the keys corresponding to a particular user's activities in a 24 hour period. In some cases, a virtual object name may be exactly like other objects, with details of the virtualization stored in the metadata. In some other cases, a portion of the namespace may be reserved to indicate that an object is a virtual object or a particular type of a virtual object. For example, buckets or object names ending in "0.1" might be treated as log virtual objects.

Download messages to request a virtual object may be formatted identically to download requests for non-virtual objects. In some cases, upload messages may be the same for virtual and non-virtual objects. In some other cases, uploaded to a reserved namespace (e.g. "0.1") may automatically become virtual objects with storage of the uploaded object delegated to another storage system.

In some implementations, users can control which buckets and/or objects logging should be applied to. For example, all buckets and/or objects may default to have logging enabled or disabled. If the user specifies differently, the logging is then enabled or disabled for those specified buckets or objects. In some cases, the user can specify a class or property (e.g. all image files, all buckets that begin with a particular substring) for which logging should enabled or disabled. The user can also designate where a given log should be stored. For instance, a user can designate logging for buckets 1, 2, and 3 and store the resulting log in bucket 3. In that case, the activity log, or a virtual log object corresponding to the activity log, can be stored in bucket 3.

The query system 122 can receive queries from the client 102, or another client that, for example, has been given permission by the client 102 (e.g. an administrator responsible for the client 102), and run those queries against the activity logs. For instance, when submitting a query, if the requesting user is authorized, the user can specify the particular activity logs to be included in the query. In some implementations, these queries may be in the form of a textual query (e.g. a MySQL query). Alternatively, or additionally, the query system 122 can provide a graphical interface to the client 102 for submitting queries. The graphical interface may include tools for building a query, such as a calendar tool for setting a date range and a drop-down box to select an activity type.

In addition to creating virtual objects for the activity logs in the query system 122, the interface backend 108 can create virtual objects for data objects stored in other systems (not shown) according to user instructions. These other systems can include other hosted storage systems that the user has identified, the client 102 or other client devices that the user wishes to include. Thus, more generally, a virtual data object may correspond to data stored in a delegated storage service, and may include metadata that enables access to the data in the delegated storage service, but does not itself include the data. Authorization, access, encryption, bucket organization, and many other services performed by the interface backend 108 for data objects can also be performed for the virtual objects. When the client 102 requests a copy of the virtual object, the interface backend 108 can, if the user is authorized, use the virtual object to formulate and serve a response that includes metadata to access the data in a delegated storage service. With this information, the client 102 may then formulate a request to the system that stores the data object referenced by virtual object.

The query system described here is only one of many possible uses of virtual objects in the hosted storage system 120. Another example involves using virtual objects to represent assets (e.g. media files such as music and movies) that a user has rights to stream but not make copies of. In this example, the user could integrate the streaming assets into a library of copied assets, providing a single interface for all assets.

In another case, the virtual objects may reference information that is dynamic and difficult to represent by an object stored in the hosted storage system 120. For example, virtual objects may reference input streams from instruments in meteorological stations. A weather prediction application running on the client 102 can, if authorized by the user, use the virtual objects in the hosted storage system 120 as input and then store the resulting output as data objects in the hosted storage system 120.

In yet another configuration, virtual objects may reference data on the client 102 itself. For example, the client 102 may be a user's desktop computer. The user may store some documents in the hosted storage system 120, and may store some on their client 102 (e.g. to limit the amount of data stored in the hosted storage system 120 or because they doubt they will need the document at another computer). The client may choose to run a crawler on the client 102 to index directories identified by the user and send messages to the hosted storage system 120 to create virtual objects in mirrored buckets. Later, the same user may log into the hosted storage system with another client 102 (e.g. the user's laptop or mobile device) and decide to access one of the documents identified by a virtual object. If the user is authorized on the other client 102, the other client 102 or the hosted storage system 120 can use the metadata from the virtual object to fetch the document from the user's desktop client 102 and provide it to the user. As described here, the client 102 may be the device that the user is physically interacting with—e.g. a laptop that receives keyboard and mouse input. In other configurations, the client 102 may be a device, proxy, gateway, or other similar structure that is in communication with the device that the user is physically interacting with. This may be the case, for example, when the client app 103 is a so called "hosted application" or "cloud app."

Figure 2:
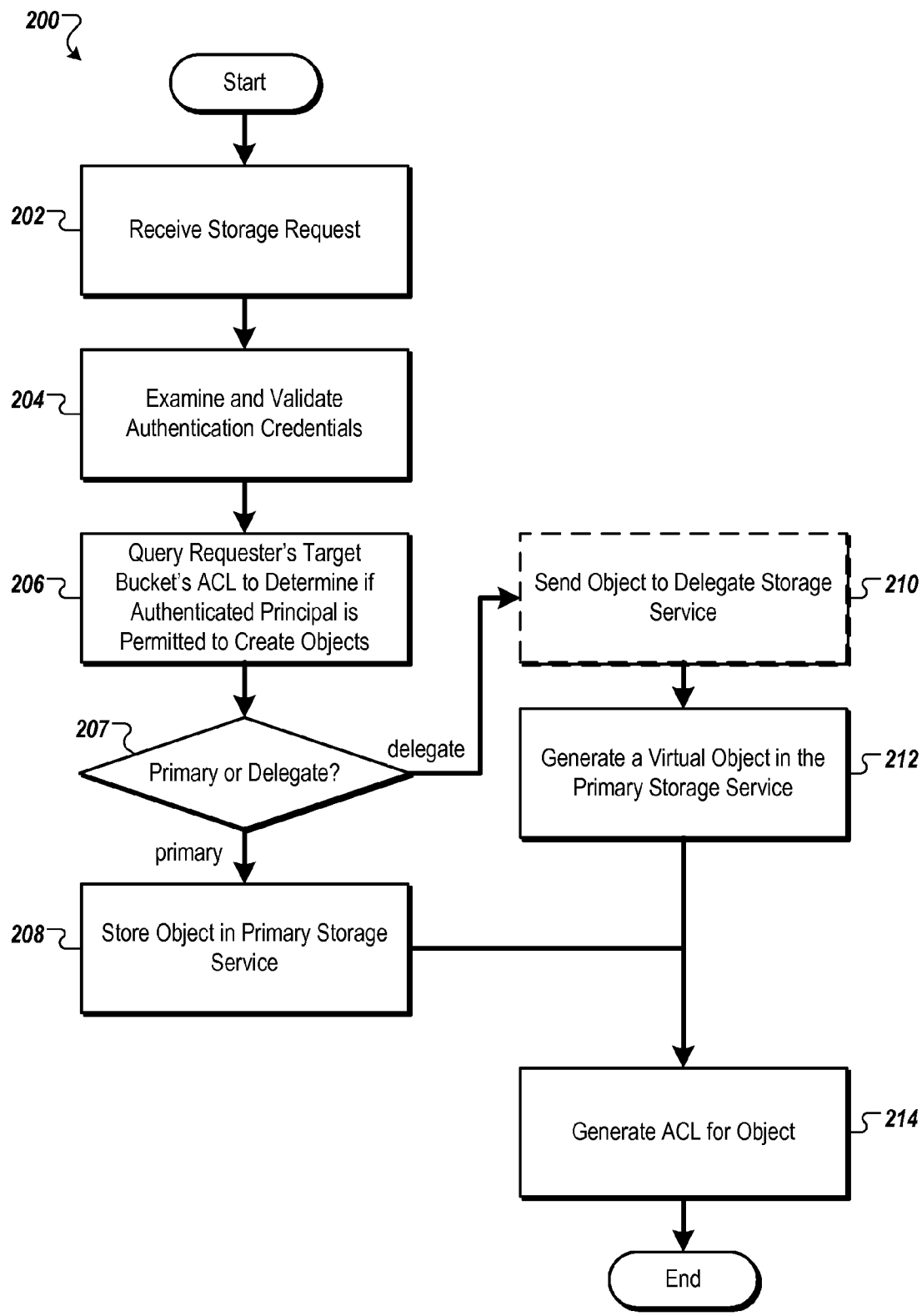
FIG. 2 is a flow chart showing an example of a process for storing data in a hosted storage service.

FIG. 2 is a flow chart showing an example of a process 200 for storing data in a hosted storage service. The process 200 can be performed by, for example, the interface frontend 106 and the interface backend 108, and for clarity of presentation, the description that follows uses the system 100 as the basis for describing the process. However, another system, or combination of systems, may be used to perform the process 200.

A request is received by the interface frontend 106 from the client application 103 to store an object (202). The request can include a HTTP PUT or POST request, an authentication credential that authenticates the principal (entity) making the request, a data object, and a target for the object consisting of a bucket and data object name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage service 120. External credentials (e.g., user names and passwords for another system) can be sent to the associated external system for validation.

The interface backend 108 can query the request's target bucket's ACL 118 to determine if the authenticated principal is permitted to create an object in the bucket (206). For example, the principal or a group the principal is a member of can have the WRITE or FULL_CONTROL role assigned in the bucket's ACL 118, which would allow the principal to create an object in the bucket. If the principal is not authorized to create an object, the request is denied.

The interface backend can determine if the object should be stored in a primary storage service or a delegate storage service (207). For example, different types of data may be stored in different hosted storage systems. Some objects may be stored in the primary storage service as data objects. Other objects may be stored in the delegate storage service with a corresponding virtual object in the primary storage service that references data in the delegate storage service.

For example, the hosted storage system can keep a list of rules or heuristics to determine which system should store a particular object. In some cases, the rules may be based on a feature of the object. That is, an object of a particular size or format may be stored by the hosted storage system, and other objects should be stored in other systems. The decision as to where to store the object may be based on a flag or other data in the request to store the object. For instance, the request may include a flag that indicates the data object should be created as a virtual data object, and provide information about where the data object should be stored. The request may include a URI, and if present, the interface backend 108 can determine that the object should be stored by a system at that URI. As another option, the rules may indicate that objects from a particular client or class of clients should be stored in primary or delegate storage systems. In the activity log example previously described, an object created by the interface backend 108 or other logging system can set to be stored in the query system 122, and an object received from the client 102 can be set to be stored in the data store 112.

If the interface backend 108 determines that the object should be stored by a primary storage service (207), the interface backend 108 uploads the object to the target bucket with the target data object name to a datastore 112 (208). In some examples, each bucket is associated with only a single datastore 112, and specifying a target bucket specifies a datastore 112. In some examples, the interface backend 108 can examine the data object or use a parameter in the RPC from the interface frontend 106 to determine which datastore 112 to store the object in, with associated metadata 116 indicating the location of the object (that is, the particular datastore the object is stored in and the object's location in that datastore).

If the interface backend 108 determines that the object should be stored by a delegate storage service (207), the interface backend 108 can, optionally (for example, if the object was received with the request), pass the object to a delegate storage service (210). That is, the interface backend 108 may determine that the object may need to be stored in the delegate storage service, and may initiate that storage. In other implementations, the request may not include the data object itself, but may include information about how to access a data object already hosted in the delegate storage service. In that case, the interface backend 108 may not need to take any action with respect to storing the data object.

The delegate storage service may be any type of appropriate system that can store and serve data. In some implementations, the delegate storage service may be a subcomponent of the hosted storage system 120, a peer of the hosted storage system 120, or a completely separate system in communication with the hosted storage system by the network 104. Depending on the configuration and communication protocols used, the delegate storage service may respond to the object with an acknowledgement. For example, to demonstrate that the delegate storage service has received the object in a complete and uncorrupted form, the delegate storage service may generate a checksum for the interface backend 108. The interface backend 108 can then ensure that the checksum matches one calculated by the hosted storage system 120 before transmission.

The interface backend 108 generates a virtual object in the primary storage service (212). This virtual object can include metadata designating how to access the object from the delegate storage service, but not including the data for the object itself. For example, if the delegate data store identifies stored objects by the address of the delegate data store and a unique identifier, the metadata generated by the interface backend 108 and stored in the virtual object can include that address and unique identifier.

The interface backend 108 creates an ACL 118 representing the access control list for the newly created object (214). In some examples, a default ACL 118 is used or an ACL 118 can be specified by the request from the client 102. The interface backend 108 can create this ACL in substantially the same way, regardless of if the object or a virtual object referencing the object is being stored in the primary storage service.

The interface backend 108 generates a new document key request to the keystore 109 for a wrapped key for every principal (user or group) in the ACL 118 with permissions to read the object or modify the object's ACL 118. Each new wrapped key is tied to a single principal. The keystore 109 can also supply an encryption key to encrypt the wrapped keys, or the interface backend 108 can reuse the encryption key from the step 108.

The interface backend 108 stores the object's ACL 118 and wrapped keys in the object's metadata 116. The encryption key or keys can be discarded by the interface backend 108.

Figure 3A:
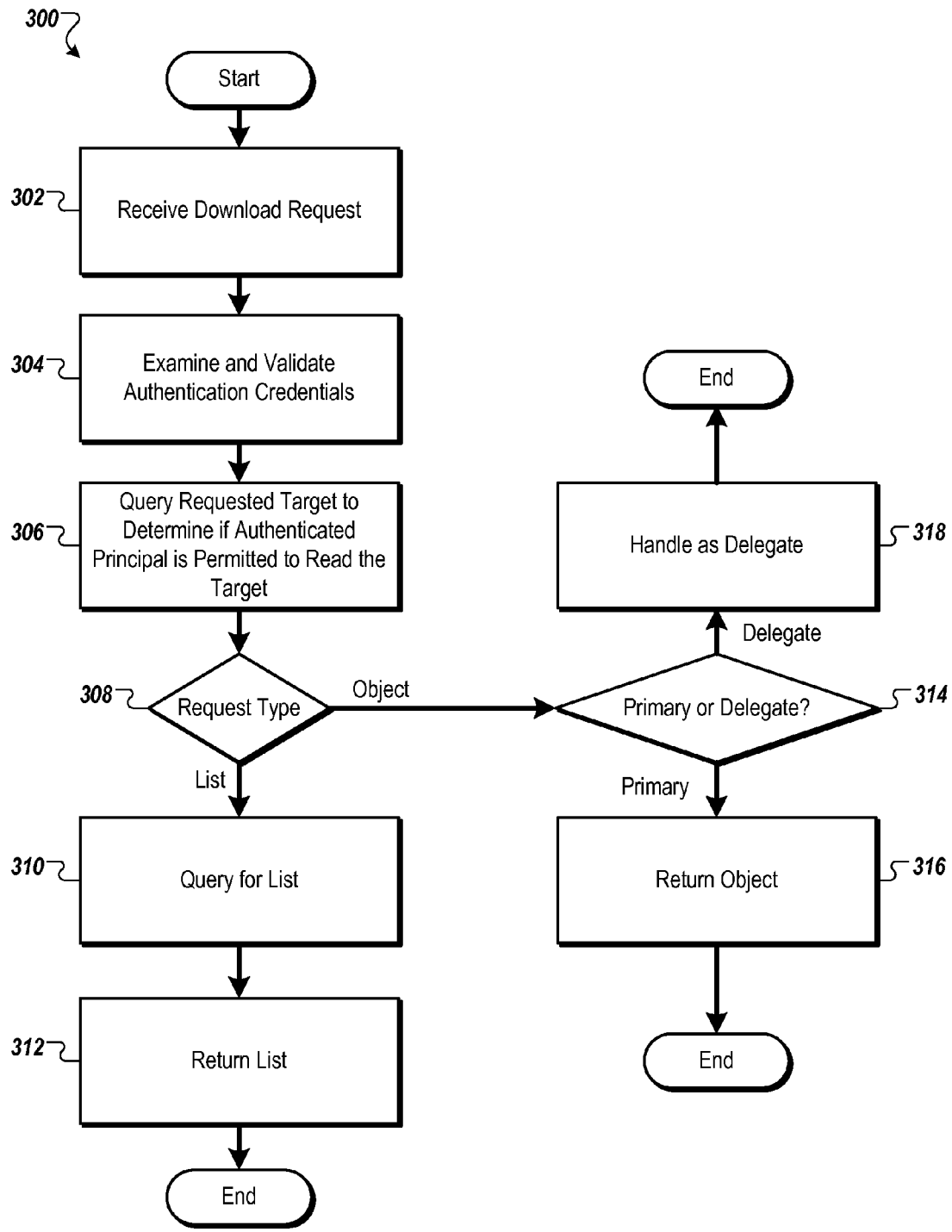
FIG. 3A is a flow chart showing an example of a process for providing data in a hosted storage service.

FIG. 3A is a flow chart showing an example of a process for providing data in a hosted storage service. The process 300 can be performed by, for example, the interface frontend 106 and the interface backend 108, and for clarity of presentation, the description that follows uses the system 100 as the basis for describing the process. However, another system, or combination of systems, may be used to perform the process 300.

A request is received by the interface frontend 106 from the client application 103 to download an object (302). The request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage service 120. External credentials (e.g., user names and passwords for another system) can be sent to the associated external system for validation.

The interface backend 108 queries the request's bucket or object ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the object, the request is denied.

Otherwise, the interface backend 108 determines if the request is for a bucket or for an object (308). If the request is for a bucket, the interface backend 108 queries for a list of the bucket's contents (310) and the listing is returned to the client application 103 (312).

If the request is for an object, the interface backend 108 determines if the requested object is stored by the hosted storage system 120 (and therefore in the primary storage system), or if a virtual object referencing the object is stored (and therefore the object is stored in a delegated storage system) (314). To make this determination, the interface backend 108 can determine if the requested object is a virtual object. In one example, the address of the object can signify that an object is a virtual object. The address may have a particular prefix, postfix, or other element. The hosted storage system can examine the object address, before fetching the object, to determine if the requested object is a virtual object. In another example, the interface backend can decrypt, with the appropriate wrapped key, the requested object and determine if it matches the format of a virtual object or not. In yet another example, all virtual objects created by the hosted storage system 120 can be specifically marked as such. One such example includes a bitstring prepended to each virtual object after the virtual object is encrypted. If the bitstring is detected by the interface backend 108, the object is handled as a virtual object.

If the object is determined to be stored in the primary storage service, the interface backend 108 can return the object (316). For example, the interface backend 108 can look up the appropriate wrapped key for the given authenticated requestor from the object's metadata 116. The interface backend 108 can send the wrapped key and the authentication credentials to the keystore 109, which can return the decrypted object encryption key to the interface backend 108 (316). The interface backend 108 can fetch and decrypt the target object and return it to the client application 103 in a download response.

If the object is determined to be stored in the delegate storage service, the interface backend 108 can handle the request as being for a virtual object with the data object stored in a delegated storage system (318). An example of a process for doing so is described with respect to FIG. 3B.

Figure 3B:
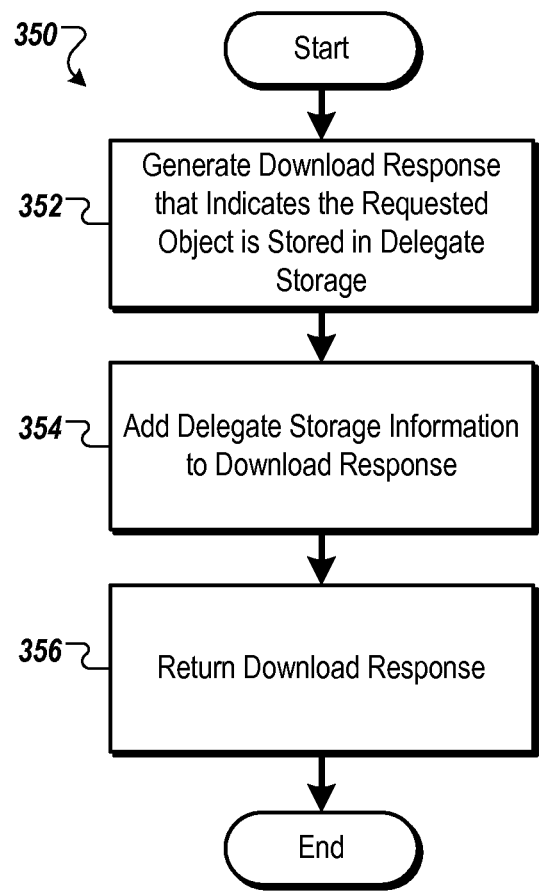
FIG. 3B is a flowchart showing an example of a process for returning a message to a request for a virtual object.

FIG. 3B is a flowchart showing an example of a process 350 for returning a message to a request for a virtual object. The process 350 can be performed by, for example, the interface frontend 106 and the interface backend 108, and for clarity of presentation, the description that follows uses the system 100 as the basis for describing the process. However, another system, or combination of systems, may be used to perform the process 350.

The interface backend 108, to respond to a request for a virtual object, can generate a download response that indicates that the requested object is stored in a delegate storage (352). For example, the hosted storage system 120 may have a template response to be used for any virtual object request, or a template for each delegate storage system used. The interface backend 108 can generate a new download response from such a template and add, for example, some or all of the metadata of the virtual object and/or information about, for example, the state of the hosted storage system 120 (e.g. a timestamp). In some implementations, this download response may take the same form and format as download responses used to return objects stored by the hosted storage system 120. The interface backend 108 can add the delegate storage information to the download response (354). For example, the interface backend 108 may retrieve metadata for accessing the object in delegate store from the corresponding virtual object and add that metadata to the download response in a clear-text form. In other examples, the interface backend 120 may translate, convert, decompress, or otherwise alter the metadata stored in the virtual object before adding the metadata to the response request. For example, to save space, the hosted storage system 120 may maintain a table mapping a URI for each delegate storage system to a unique, shorter, identifier. The virtual object, potentially one of many, may store the shorter identifier instead of the entire URI in order to save space. Then, when the interface backend 108 adds the delegate storage information to the download response, the entire URI is used, not just the shorter identifier.

The hosted storage system 120 can return the download response to the client application 103. For example, the download request may be transmitted directly from the interface frontend 106, over the network 104, to the client 102. Then, the client 102 can use the download response to, for example, request the object from the delegate storage system. In another example, the download response is transmitted to an intermediary. The intermediary may, for example, access the object from the delegate storage system on behalf of the client 102. The query system 122 may be configured to be one such example intermediary.

Figure 4:
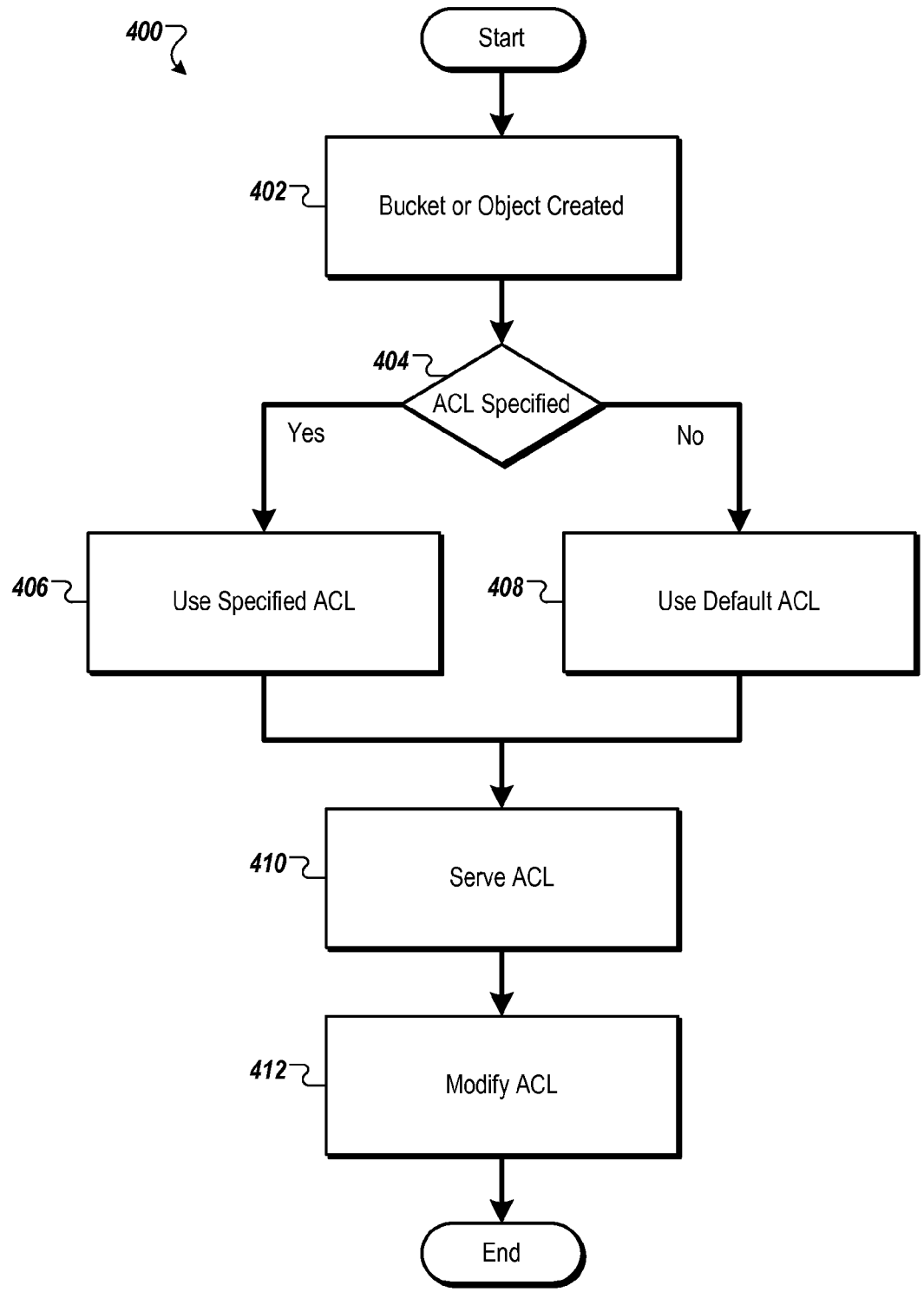
FIG. 4 is a flow chart showing an example lifecycle of an access control list.

FIG. 4 is a flow chart showing an example lifecycle 400 of an ACL 118. Although the steps of the lifecycle 400 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or object is created by the backend interface 108 based on requests from the client application 103 (402). The client request can include a bucket name, an object name, and/or an ACL 118. The principal requesting the new bucket or object is authenticated and made the owner of the bucket or object.

If an ACL 118 is specified in the request (404), the specified ACL 118 is associated with the bucket or object. If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" ACL. A list of pre-specified or 'canned' ACLs 118 is shown in Table 4 Canned ACLs below. The canned ACLs 118 can be cataloged by the hosted storage system 120 and referenced by the client application 103 by name, rather than requiring the request enumerate each scope and role pair.

TABLE 4

| Canned ACLs | |
| --- | --- |
| Canned ACL Name | {scope, permission} |
| private | {creating user or bucket owner, FULL_CONTROL} |
| public-read | {all users, READ} {bucket owner, FULL_CONTROL} |
| public-read-write | {all users, WRITE} {bucket owner, FULL_CONTROL} |

TABLE 4-continued

Canned ACLs

| Canned ACL Name | {scope, permission} |
| --- | --- |
| authenticated-read | {all authenticated users, READ} |
| | {bucket owner, FULL_CONTROL} |
| bucket-owner-read | {bucket owner, READ} |
| [for objects only] | {object owner, FULL_CONTROL} |
| bucket-owner-full-control | {bucket owner, FULL_CONTROL} |
| [for objects only] | {object owner, FULL_CONTROL} |

If an ACL 118 is not specified in the request (404), a default ACL 118 can be used (408). For example, bucket and object creation can default to the "private" canned ACL 118 for authenticated users. For object creation by unauthenticated users, such as for new objects created in a "public-read-write" bucket, a default of "bucket-owner-full-control" can be used.

An ACL 118 can be served, for example, to a principal with READ, WRITE, or FULL_CONTROL of the associated bucket or object (410). For example, a client application 103 can perform a HTTP GET to a target's URI with the query string ?acl to retrieve the ACL associated with the target. The ACL 118 can be serialized and returned to the client application 103.

The serialization may be defined, for example, by the following extended Backus-Naur form. Nonterminals appear in sans serif italics, terminals appear in Courier Bold, { } denote zero or more repetitions, [ ] enclose optional entities, | separates alternatives, and ( ) denote grouping. The terminal symbols canonical-id, email-address, and domain are defined in English below:

```
access-control-list: <AccessControlList> owner entries
</AccessControlList>
owner: <Owner> id </Owner>
entries: <Entries> entry { entry } </Entries>
entry: <Entry> ( permission scope | scope permission ) </Entry>
permission: <Permission> ( READ | WRITE | FULL_CONTROL )
</Permission>
scope: <Scope type=UserById> id </Scope>
| <Scope type=UserByEmail> email </Scope>
| <Scope type=GroupById> id </Scope>
| <Scope type=GroupByEmail> email </Scope>
| <Scope type=GroupByDomain> <Domain> domain </Domain>
</Scope>
| <Scope type=AllUsers/>
| <Scope type=AllAuthenticatedUsers/>
id: <ID> canonical-id </ID> [ <Name> text </Name> ]
| [ <Name> text </Name> ] <ID> canonical-id </ID>
email: <EmailAddress> email-address </EmailAddress> [ <Name> text
</Name>]
| [ <Name> text </Name> ] <EmailAddress> canonical-id
</EmailAddress>
text: { printable character excluding < and > }
canonical-id: 64 hex digits
email-address: standard RFC 822 email address
domain: standard RFC 822 domain specification
```

A canonical-id or an email-address can identify a user or a group. A canonical-id is the encrypted service id for the user or group. Email addresses are a convenience for specifying canonical ids. In some implementations, the ACLs returned from the system always contain canonical ids. The <Name>text</Name> element may be used for information purposes only such that it is otherwise ignored by the system, and the system does not return it if there is no public name associated with the user or group.

An example serialized ACL 118 is shown below.

```
<AccessControlList>
<Owner>
<ID>a9a7b886d6fd24a52fe8ca5bef65f89a64e0193f23000e241bf9b1c61be666e9</ID>
<Name>chriscustomer</Name>
</Owner>
<Entries>
<Entry><Permission>FULL_CONTROL</Permission>
<Scope type=UserById>
<ID>a9a7b886d6fd24a52fe8ca5bef65f89a64e0193f23000e241bf9b1c61be666e9</ID>
<Name>chriscustomer</Name>
</Scope>
</Entry>
<Entry><Permission>FULL_CONTROL</Permission>
<Scope type=UserById>
<ID>79a59df900b949e55d96a1e698fbacedfd6e09d98eacf8f8d5218e7cd47ef2be</ID>
<Name>Frank</Name>
</Scope>
</Entry>
<Entry><Permission>FULL_CONTROL</Permission>
<Scope type=UserById>
<ID>de019164ebb0724ff67188e243eae9ccbebdde523717cc312255d9a82498e394a</ID>
<Name>Jose</Name>
</Scope>
</Entry>
<Entry><Permission>READ</Permission><Scope type=AllUsers></Entry>
</Entries>
</AccessControlList>
```

An ACL 118 can be updated, for example by a principal with WRITE or FULL_CONTROL of the associated bucket or object (412). In some examples, a client must read, modify, and write an ACL 118 in order to update an ACL 118. In this example, the ACL 118 is served (410) as part of modification (412). In some implementations, a client application 103 can send ACL update requests to the hosted storage system 120.

Figure 5:
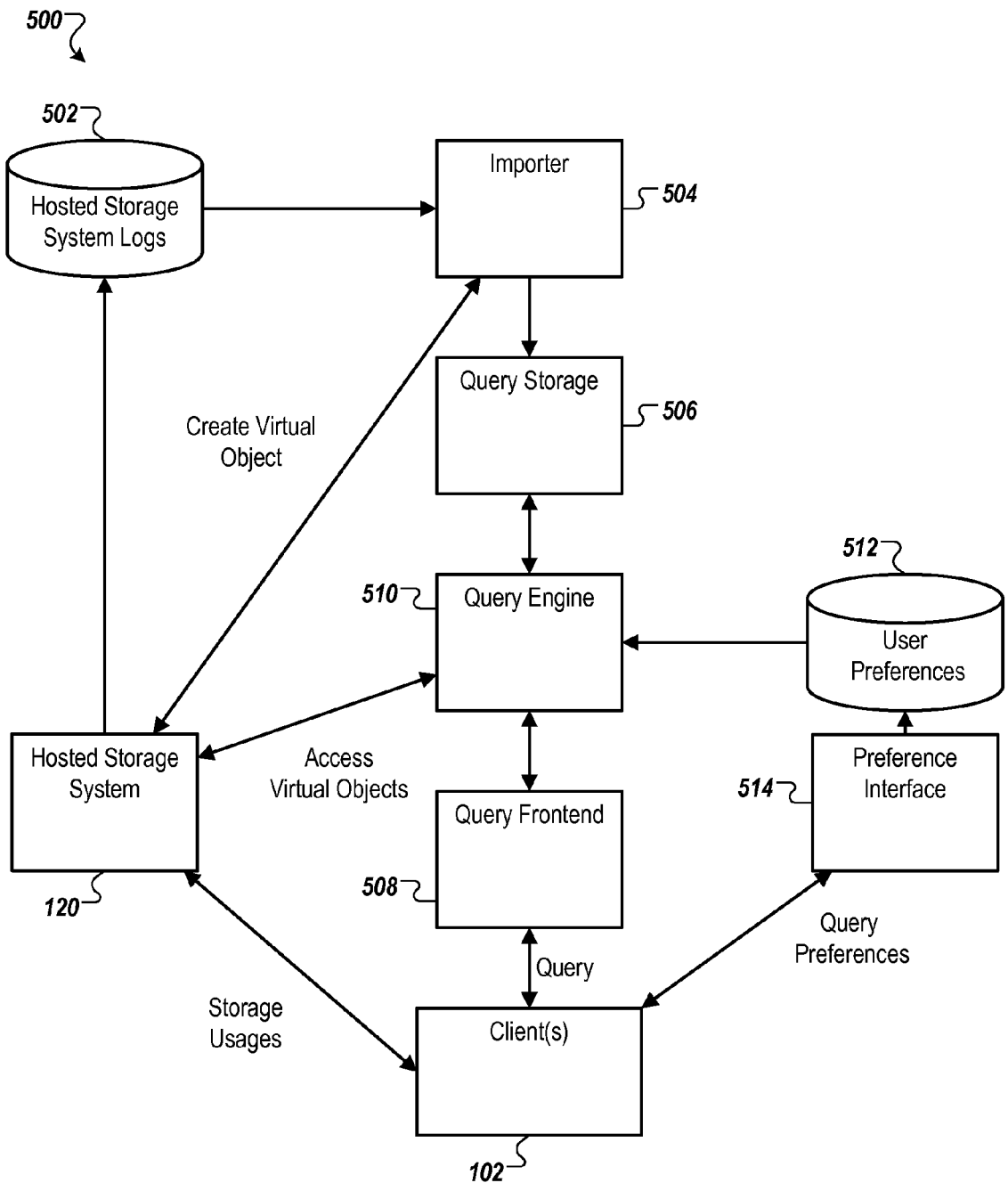
FIG. 5 is a block diagram showing an example of a system for querying activity logs in a hosted storage system.

FIG. 5 is a block diagram showing an example of a system 500 for querying activity logs in a hosted storage system. In the system 500, elements of a query system are shown as separate and external from the hosted storage system 120. In the system 100 described previously with respect to FIG. 1, the query system 122 was shown as a subsystem of the hosted storage system 120. Either arrangement is possible, as are others. For example, portions of a query system can be integrated into the hosted storage system 120 with other portions being external. In some implementations, the hosted storage system 120 and the hosted storage service 122 may be operated by a single entity. In other implementations, they may be operated by different entities.

The client 102 interacts with the hosted storage system 102 to create events within the hosted storage system 120. For instance, the client 102 can send to the hosted storage system 102 requests to perform operations related to data objects stored at the hosted storage system 102. These operations can include, but are not limited to, uploading, downloading, moving, and deleting objects or buckets within the hosted storage system 102; changing permissions; or editing account settings. For some or all of these activities, the hosted storage system 120 can log details of the events in a hosted storage system log 502. An importer 504 can import the event details from the hosted storage system logs 502 and store them in a query storage 506.

The hosted storage system logs 502 may store event details in a different format than the query storage 506. For example, the hosted storage system logs 502 may store event details in a format that is easily appended to (e.g. a text document). The query storage system 506, however, may store the same information in a format that is easily searched (e.g. a structured database). In this case, the importer 504 can convert activity from the first to the second format.

In one implementation, the hosted storage system logs 502 may store the event details in a row oriented format that is not indexed, and the query storage system 506 may store the event details in a column oriented storage that is indexed. In this case, searching of the hosted storage system logs 502 may be impossible or impractical, because all records may need to be scanned per each search, while a search of the query storage system 506 may be more efficiently completed by using the index of the column oriented data. The index may allow, for example, the search process to skip vast amounts of data while searching for records meeting a particular criteria.

The importer 504 may be configured to produce activity logs based on user instructions. For example, each bucket and object in the hosted storage system 120 can have a flag in the metadata 116 (which is set based on user instructions) to specify if the importer 504 should generate a log for that bucket or object. If the flag is set to a 'true' or 'log' value, the importer 504 can generate log data for the object or bucket. If the flag is set to 'false' or 'do not log,' the importer may not generate any log data for that object or bucket.

The importer 504 can notify the hosted storage system 120 about the information stored in the query storage 506. In response, the hosted storage system 120 can create virtual objects that reference the activity events in the query storage engine. In one configuration, one virtual object is created per user per day of activity, but other configurations are possible. The number, type, and location of the virtual objects may be set according to user instructions or other settings. For example, a user may specify logging for three buckets— buckets 1, 2, and 3—with a corresponding virtual object in bucket 3 for each day. In this configuration, the hosted storage system would generate one virtual object per day and maintain the previous virtual objects for each previous day.

Although only one hosted storage system 120 is shown here, the importer 504 can import activity information from multiple hosted storage systems 120. In this configuration, a user may be able to query all of their activity from multiple hosted storage systems 120 to get a more complete account of some of their storage activity.

The client 102 may generate one or more activity queries and send the query to the query frontend 502 in a query message. For example, the queries might request information such as total bytes stored by a user; bytes in a subdirectory, path, regular expression, or by content type; a most accessed object (e.g., to track which shared objects are most popular); and aggregate computer network traffic information. The network traffic information may include geographic summaries showing traffic into and out of countries, data traffic volume, counts of connections or transfers, etc. Additionally, the queries may be formatted to determine the amount of data transfer associated with a particular user or identify a list of objects that were uploaded in a particular timeframe. The query front end 508 can extract the query from the query message, removing, for example, information such as communication headers or translating the query. The following is an example query to get the top ten users measured by the number of bytes downloaded:

SELECT SUM(out_bytes) AS bytes_downloaded, user GROUP BY user ORDER BY bytes_downloaded DESC LIMIT 10;

One feature of some configurations of this system is that the client 102 may only need to be authenticated by the hosted storage system 120 and not the query frontend 508. For example, messages from the client 102 to the query frontend 508 may contain an authentication cookie or other data that the query frontend 508 may accept as proof of the client's 102 authenticity. Other forms of shared authorization and authentication are known. In such a configuration, access to the query frontend 508 can be restricted to valid users of the hosted storage system 120 without, for example, exposing personal details of the users to the query frontend 508.

The query frontend can parse the query and pass the query to the query engine 510, along with, for example, user authentication data. The query engine can then identify one or more virtual objects hosted in the hosted storage system 120 that are needed to process the query. For example, if the query requests data in a particular date range, the query engine 510 can identify the virtual objects that correspond to that date range.

The query engine 510 can request the identified virtual objects from the hosted storage system 120 using the user authentication data received from the query frontend 508. The hosted storage system 120 can use the authentication data to determine that the request for the virtual objects is authorized, for example based on examining ACL's associated with the virtual objects, and return the metadata of the requested virtual objects.

The query engine 510 can access the activity logs from the query storage 506 based on the metadata returned by the hosted storage system 120 and process the query. The query engine 510 can use user preferences when processing the query and/or generating a response. For example, users may set a preference to receive a report as human readable text or as comma-separated values (CSV) formats, to set the column order, to use fixed or variable width columns, or to determine the set of columns to return by default.

Another example user preference that may be set is a log freshness preference. For example, the hosted storage system logs 502 and the query importer 504 may operate, by default, to ensure that the hosted storage system logs 502 and the query storage 506 are updated within a particular time window after the hosted storage system 120 creates an event. However, a user may set user preferences 512 to adjust this default. For example, if the default time window is five minutes, but the user has created an application that requires a time window of one minute, the user may set a user preference 512 accordingly. Alternatively, the user may set the time window to be greater, if the user does not need the logs to refresh as quickly as the default. In some cases, a change of this type may affect a user's bill. For example, if the user is being billed to use the hosted storage system 120 and/or the query engine 510, the user may agree to be billed more to decrease the time window, or may be given a discount to increase the time window.

The client 102 can set those preferences via a preferences interface 514. The preferences interface 514 can be configured, for example, to receive those preferences in a graphical interface such as a website served to the client 102. Additionally, or alternatively, the preference interface 514 can receive the preferences in a computer readable format (e.g. an XML or CSV). The client 102 may decide to provide the computer readable format if, for example, a single administrator is setting preferences for many users, or if the client application 103 is generating user preferences.

Once received, the preference interface 514 can store the user preferences in a user preferences datastore 512. These preferences can be indexed by user, user group, or any other suitable way of identifying one or more users.

Once the query engine 510 has created one or more query responses for a received query, the query front end can transmit the response(s) to the query frontend 508. The query frontend 508 can, if necessary, marshal, translate, serialize, encrypt, compress, or otherwise prepare the response for transmission to the client 102. The query frontend 508 can also generate a reply message around the response and transmit the response to the client 102 or any other appropriate recipient. For example, the client preferences may specify that the response should be sent to and saved by the hosted storage system 120 instead of the client 102.

Figure 6:
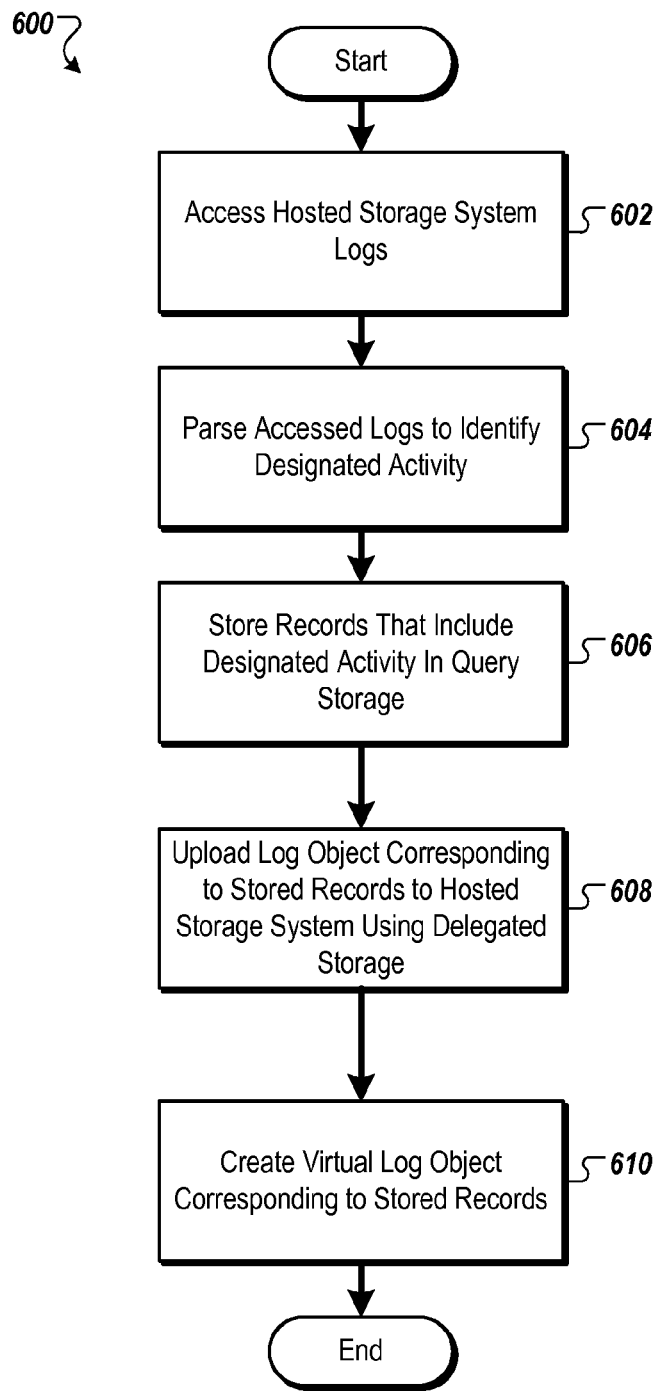
FIG. 6 is a flow chart showing an example of a process for importing hosted storage logs into a query system.

FIG. 6 is a flow chart showing an example of a process 600 for importing hosted storage logs into a query system. The process 600 can be performed by, for example, the importer 504 and the hosted storage system 120, and for clarity of presentation, the description that follows uses the system 500 as the basis for describing the process. However, another system, or combination of systems, may be used to perform the process 600.

The importer 504 accesses hosted storage system logs (602). For example, the hosted storage system logs 502 may contain information about some or all of the system events created in the hosted storage system 120. This information may be updated by the hosted storage system 120 according to one or more particular schedules. For example, the hosted storage system 120 may be configured to update the hosted storage system logs 120 at or near 'real time.' Real time, as used in this context, may mean that for any event within the hosted storage system 120, the corresponding hosted storage system logs 502 should be updated within a particular time window (e.g. within five minutes). The hosted storage system 120 may, alternatively, make these updates according to a fixed schedule (e.g. once every five minutes), or only when the resources of the hosted storage system 120 are not otherwise being utilized. The importer 504 can import the new information in the storage logs on a similar schedule, in response to detection of new information, on a different schedule, etc.

The importer 504 parses the accessed logs to identify designated activity (604). For example, the importer 504 can identify individual activities within the hosted storage system logs 502, even if each individual activity is not uniquely indexed, partitioned, or separated in the hosted storage logs. Of these individual activities, the importer 504 may only be interested in a subset of all activities. For example, the hosted storage system 120 may store user activities (e.g. object accesses, changes to ACLs) as well as lower level activities (e.g. hardware replacements, power cycles, and disk read errors). The importer 504 can identify from all activities only the ones of interest, in this example the user activities and ignore the rest.

Further, the importer 504 may only identify designated activities associated with buckets and objects for which users have enabled logging. For example, a user may indicate, in the hosted storage system or the user preferences 512, which buckets and objects will be logged. In this case, the importer 504 may identify only those activities associated with log-enabled buckets or objects.

The importer 504 stores records that indicate the designated activity in the query storage 506 (606). For example, for each of the activities identified, the importer 504 may create one record detailing all known and relevant information associated with that activity. These records may be structured according to a predefined format, for example into fields of designated size and format. In some implementations, each record may include a timestamp, a unique identifier, an identifier of one or more users and/or user groups related to the activity, an identifier of a related data object, and a description or listing of the activity type. More, fewer, and other types of information may be included as appropriate.

The importer 504 sends, to the hosted storage system 120, a request to store a log object corresponding to the stored records, the request indicating that the log object should be stored as a virtual object (608). For example, the importer 504 can generate upload messages containing the records and send the upload messages to the hosted storage system 120. Depending on the configuration of the system 500, the importer 504 can create the upload message to indicate that virtual objects should be created for the records. For example, the importer 504 may set a flag in the upload message to indicate that a virtual object should be created as well as provide information about where the corresponding data is store or how the corresponding data can be accessed. In some implementations, the importer 504 can store the records in the query storage 506 and include a reference to the records in the upload message.

The hosted storage system 120 receives the request to store the log object corresponding to the stored records. In response to receiving the request to store the log object corresponding to the stored records, the hosted storage system 120 creates a virtual object, wherein the virtual log object includes metadata that enables access to the stored records in the query storage but does not include the information regarding the performed operations (610). For example, if a flag is in the upload message, the hosted storage system 120 can identify the message as indicating the creation of virtual objects. In another example, the hosted storage system 120 can examine the records and determine that virtual objects should be created. The reference may be a URI, unique identifier, or other appropriate data. In other implementation, the records have already been stored in the query storage 506, such as by the importer 504 in (608), and the upload message may include a reference to the records. Once the reference has been received and identified, the hosted storage system can create one or more virtual objects that contain the reference. These virtual objects may be used, for example, to execute a query on the associated records, as described below.

Figure 7:
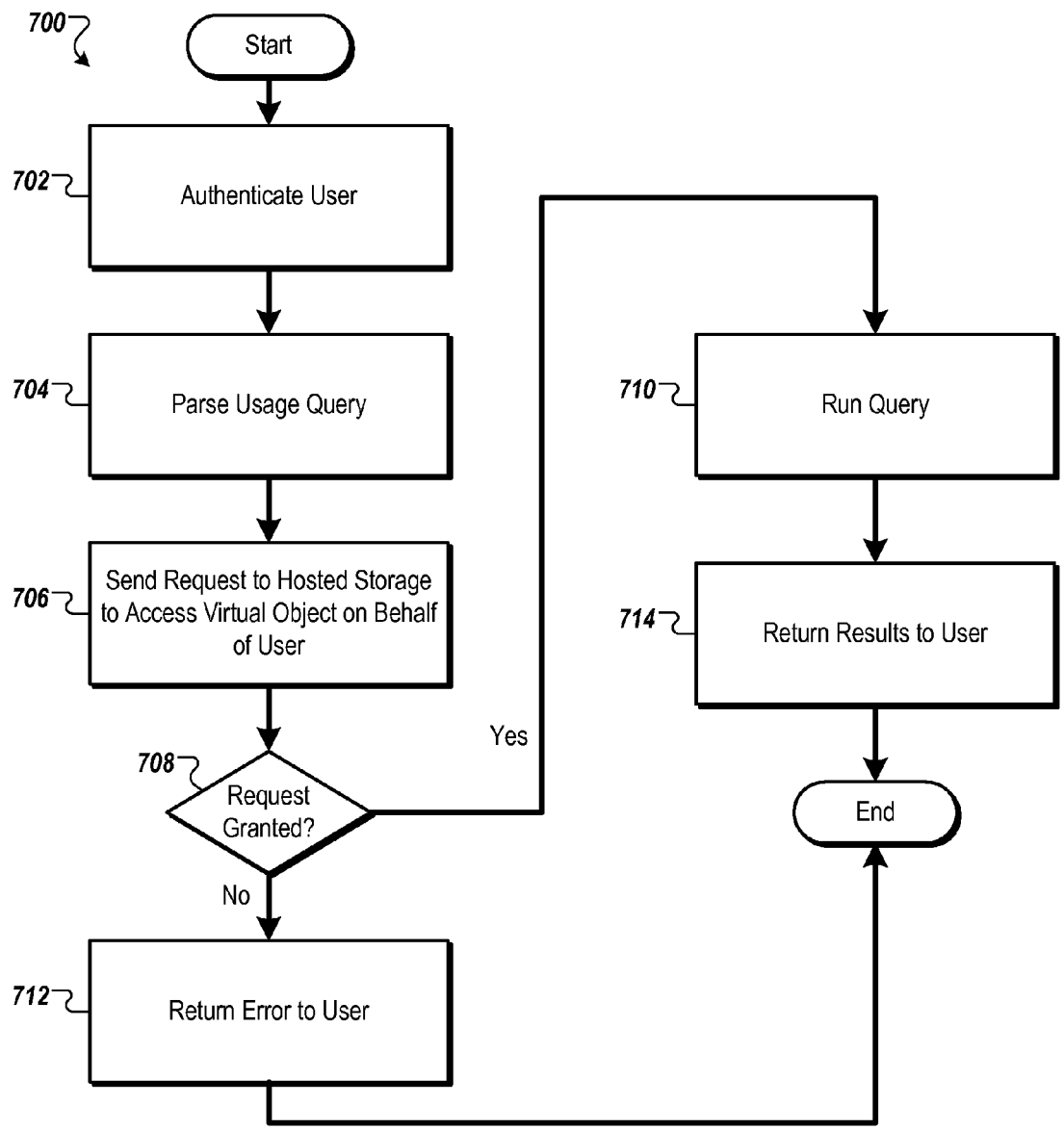
FIG. 7 is a flow chart showing an example of a process for responding to a query on an activity log.

FIG. 7 is a flow chart showing an example of a process 700 for responding to a query on an activity log. The process 700 can be performed by, for example, the system 500, and for clarity of presentation, the description that follows uses the system 500 as the basis for describing the process. However, another system, or combination of systems, may be used to perform the process 700.

The query frontend 508 can receive, from a querying client 102, a query regarding operations related to stored data objects in the hosted storage system 120. In response, the query engine 510 can determine information regarding operations related to the stored data objects based on the logged information and the query frontend 508 can send the determined information to the querying client 102.

The query frontend 508 authenticates a user (702). For example, the user, using the client 102, sends a query request to the query frontend 508. The query request may contain authentication and authorization credentials in a header, such as an HTTP header.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the query frontend 508 (e.g., the hosted storage system 120). A user can also or alternatively be authenticated based on authentication credentials from an external credentialing service or an external service that includes credentialing functionally. User or group identifier information can be calculated from the external service's credential information. Requests sent by the client 102 to the query frontend 508 can be translated and forwarded to the external service for authentication.

The query frontend 508 parses the usage query (704). The received query request may designate a usage query and the activity logs against which the usage query should be run. For example, the query request may contain the usage query in a header, such as an HTTP header. The query may have been created by the user, for example using a text editor, an integrated development environment (IDE), or a graphical user interface created by the client 102 or the query frontend 508. Additionally, or alternatively, the query may be machine created, for example by a client application 103.

The query frontend 508 can identify the usage query in the query message and parse the query to identify the one or more activity logs needed to process the query. In some cases, the activity logs may be identified in the query. In some other cases, the query may identify records, and the query frontend 508 can identify the corresponding activity logs that are needed. In some implementations, the query may not designate the activity logs because they were previously designated.

The query frontend 508 sends the usage query to the query engine 510 and the query engine 510 sends a request to the hosted storage system 120 to access a virtual object on behalf of the user (706). The designated activity logs can correspond to virtual objects in the hosted storage system 120 and, as a result, to access the activity logs, the query engine 510 accesses the corresponding virtual objects in the hosted storage system. The query engine 510 can, for example, generate a GET message that identifies the virtual objects needed. This message can include a cookie, authentication token, or other information that shows that the message is on behalf of the user, even if the message is not coming from a system used by the user.

If the request is granted by the hosted storage system 120 (708), the query engine 510 runs the query (710). If the request is not granted by the hosted storage system 120 (708), the query frontend 508 returns an error to the user (712). For example, the hosted storage system 120 may identify the user based on the user credentials. The hosted storage system 120 may then determine that, based for example on an ACL associated with the virtual object, the user is permitted to access the virtual object and therefore grant the request.

If the request is granted, the hosted storage system 120 can send, to the query engine 510, a response that includes the metadata that enables access to the stored records in the query storage 506. Using the metadata, the query engine 510 can identify the information in the query storage 506 upon which to operate. The query engine 510 can execute the query on this identified information to determine the information regarding the operations related to the stored data objects based on the accessed records. In some implementations, this query can be in a structure query language such as the Structured Query Language (SQL) or MongoDB, but any appropriate structured, semi-structured, or unstructured language can be used.

On the other hand, the hosted storage system 120 may reject the request if the message, the credentials, or the request are invalid. Examples of such invalid states include, but are not limited to, corrupted or expired credentials or a request for a virtual object that does not exist or that the user does not have access to. In such a case, the hosted storage system 120 can return an error message or other denial to the query frontend 508, which can send the error message, or another corresponding denial message, to the user.

Once the query is complete, the query engine 510 sends the results to the query frontend 508, which returns the results to the user (716). In some implementations, the query frontend 508 can return results as they are produced by the query engine, or convert all results, for all users, to a standard format. User preferences 512 may indicate another format, and the query frontend 508 can return the results to the user in the format identified. Additionally, or alternatively, the query frontend 508 can return the results in the form of a graphical interface such as a webpage. The webpage may contain text, graphics, and control elements. The control elements may be configured to generate new queries or change the display of the webpage. For example, a graphic showing activity over time can have start and end elements that can be moved along a timeline. As these elements are moved, the graphic can update to zoom in or zoom out appropriately. This change in display may require a new query, or may merely involve showing the current results in a new way.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary.

The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, WiFi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A system comprising:
   a hosted storage service comprising at least one processor and at least one computer readable memory and configured to:
   store a virtual data object that corresponds to data stored in a delegated storage service, wherein the virtual data object includes metadata that enables access to the data that corresponds to the virtual data object but does not include the data that corresponds to the virtual data object;
   receive, from a client application, a request for access to the virtual data object;
   send a response that includes the metadata that enables access to access the data that corresponds to the virtual data object;
   store a data object that contains data for the data object;
   receive, from the client application, a request for access to the data object;
   send a response that includes the data for the data object; and
   the delegated storage service comprising at least one processor and at least one computer readable memory and configured to:
   store the data that corresponds to the virtual data object;
   receive, from the client application, a request for access to the data that corresponds to the virtual data object;

in response to receiving the request for access to the data that corresponds to the virtual data object, send the data that corresponds to the virtual data object to the client application;
the client application configured to:
send the request for access to the virtual data object to the hosted storage service;
receive, from the hosted storage service, the response that includes metadata that enables access to the data that corresponds to the virtual data object;
generate the request for access to the data that corresponds to the virtual data object based on the metadata;
send the request for access to the data that corresponds to the virtual data object to the delegated storage service;
receive the data that corresponds to the virtual data object from the delegated storage service;
send the request for the data object to the hosted storage service; and
receive, from the hosted storage service, the response that includes the data for the data object.

2. The system of claim 1 wherein the request for access to the virtual data object includes user credentials for a user and the hosted storage service is configured to:
determine that the user is authorized to access the virtual data object based on the user credentials and an access control list associated with the virtual data object; and
in response to determining that the user is authorized to access the virtual data object, send, to the client application, the response that includes the metadata that enables access to the data that corresponds to the virtual data object.

3. The system of claim 1 wherein the hosted storage service is configured to:
receive a request to store the virtual data object, the request indicating that the virtual data object should be stored as a virtual data object and including information that enables access to the data that corresponds to the virtual data object in the delegated storage; and
in response to receiving the request to store the virtual data object, create the virtual data object.

4. The system of claim 1 wherein the client application is authenticated by the hosted storage service and the client application is not authenticated by the delegate storage service.

5. A method performed by one or more processors, the method comprising:
storing, by a hosted storage service, a virtual data object that corresponds to data stored in a delegated storage service, wherein the virtual data object includes metadata that enables access to the data that corresponds to the virtual data object but does not include the data that corresponds to the virtual data object;
receiving, by the hosted storage service and from a client application, a request for access to the virtual data object;
sending, from the hosted storage service, a response that includes the metadata that enables access to the data that corresponds to the virtual data object such that the client application is able to access the data that corresponds to the virtual data object from the delegated storage service;
receiving, by the delegated storage service, a request for access to the data that corresponds to the virtual data object based on the metadata;
sending, from the delegated storage service, the data that corresponds to the virtual data object;
storing, by the hosted storage service, a data object that contains data for the data object;
receiving, by the hosted storage service and from the client application, a request for access to the data object; and
sending, by the hosted storage service, a response that includes the data for the data object.

6. The method of claim 5, wherein the request for access to the virtual data object includes user credentials for a user, the method further comprising:
determining, by the hosted storage service, that the user is authorized to access the virtual data object based on the user credentials and an access control list associated with the virtual data object; and
in response to determining that the user is authorized to access the virtual data object, sending, by the hosted storage service to the client application, the response that includes the metadata that enables access to the data that corresponds to the virtual data object.

7. The method of claim 5, further comprising:
receiving, by the hosted storage service, a request to store the virtual data object, the request indicating that the virtual data object should be stored as a virtual data object and including information that enables access to the data that corresponds to the virtual data object in the delegated storage; and
in response to receiving the request to store the virtual data object, creating, by the hosted storage service, the virtual data object.

8. The method of claim 5 wherein the client application is authenticated by the hosted storage service and the client application is not authenticated by the delegate storage service.

9. One or more non-transitory computer readable storage medium storing one or more computer programs, the programs comprising instructions that, when executed by one or more processing devices, cause the one or more processing devices to perform operations comprising:
storing, by a hosted storage service, a virtual data object that corresponds to data stored in a delegated storage service, wherein the virtual data object includes metadata that enables access to the data that corresponds to the virtual data object but does not include the data that corresponds to the virtual data object;
receiving, by the hosted storage service and from a client application, a request for access to the virtual data object;
sending, from the hosted storage service, a response that includes the metadata that enables access to the data that corresponds to the virtual data object such that the client application is able to access the data that corresponds to the virtual data object from the delegated storage service;
receiving, by the delegated storage service, a request for access to the data that corresponds to the virtual data object based on the metadata;
sending, from the delegated storage service, the data that corresponds to the virtual data object;
storing, by the hosted storage service, a data object that contains data for the data object;
receiving, by the hosted storage service and from the client application, a request for access to the data object; and
sending, by the hosted storage service, a response that includes the data for the data object.

10. The computer readable storage medium of claim 9, wherein the request for access to the virtual data object includes user credentials for a user, the method further comprising:

determining, by the hosted storage service, that the user is authorized to access the virtual data object based on the user credentials and an access control list associated with the virtual data object; and in response to determining that the user is authorized to access the virtual data object, sending, by the hosted storage service to the client application, the response that includes the metadata that enables access to the data that corresponds to the virtual data object.

11. The computer readable storage medium of claim 9, the method further comprising:

receiving, by the hosted storage service, a request to store the virtual data object, the request indicating that the virtual data object should be stored as a virtual data object and including information that enables access to the data that corresponds to the virtual data object in the delegated storage; and in response to receiving the request to store the virtual data object, creating, by the hosted storage service, the virtual data object.

12. The computer readable storage medium of claim 9, wherein the client application is authenticated by the hosted storage service and the client application is not authenticated by the delegate storage service.

* * * * *